US007921595B1

(12) United States Patent
Monson et al.

(10) Patent No.: US 7,921,595 B1
(45) Date of Patent: Apr. 12, 2011

(54) FLOATING BIOMASS PRODUCING SYSTEM

(75) Inventors: Robert J. Monson, St. Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 108 days.

(21) Appl. No.: 12/500,969

(22) Filed: Jul. 10, 2009

(51) Int. Cl.
*A01G 7/00* (2006.01)

(52) U.S. Cl. .......................................................... 47/1.4

(58) Field of Classification Search ...................... 47/1.4
See application file for complete search history.

(56) References Cited

U.S. PATENT DOCUMENTS

| | | | | |
|---|---|---|---|---|
| 3,955,317 | A * | 5/1976 | Gudin | 435/420 |
| 4,324,067 | A * | 4/1982 | Kessler | 47/1.4 |
| 4,363,703 | A | 12/1982 | ELDifrawi et al. | |
| 4,536,988 | A * | 8/1985 | Hogen | 47/1.5 |
| 4,888,912 | A * | 12/1989 | Murray | 47/1.4 |
| 5,766,474 | A * | 6/1998 | Smith et al. | 210/602 |
| 2002/0020010 | A1 | 2/2002 | Mizutani | |
| 2003/0094141 | A1 | 5/2003 | Davis | |
| 2003/0228195 | A1 | 12/2003 | Mizutani | |
| 2007/0017864 | A1 | 1/2007 | Price et al. | |
| 2008/0124446 | A1 | 5/2008 | Markels | |
| 2010/0170150 | A1 * | 7/2010 | Walsh, Jr. | 47/1.4 |
| 2010/0170151 | A1 * | 7/2010 | Huber | 47/1.4 |

* cited by examiner

*Primary Examiner* — Christina Johnson
*Assistant Examiner* — Robert Warden
(74) *Attorney, Agent, or Firm* — Hamre, Schumann, Mueller & Larson, P.C.

(57) ABSTRACT

A water based biomass producing system that is disposed in a body of water, for example a freshwater lake or a sea, and is capable of producing a biomass that can be converted into a biofuel. The system relies on a pool of freshwater that is suspended in the body of water to grow the biomass. The pool is contained within a flexible polymeric membrane that is impermeable to the water of the body of water. The membrane is suspended in the body of water by a float. A filtration system is connected to the float that has an inlet that is for introduction of water from the body of water and an outlet that is for discharging freshwater into the pool. A biomass extractor is provided to harvest the biomass from the freshwater pool. The harvested biomass can then be converted into a biofuel.

20 Claims, 2 Drawing Sheets

10
40
28
22
18
50
24
36
30
26
16
34

FLOATING BIOMASS PRODUCING SYSTEM

FIELD

This disclosure relates to the creation of an alternative energy source, in particular to creating a biomass in a large body of water for use in producing a biofuel.

BACKGROUND

The threat of fuel shortages along with increased energy costs and environmental concerns, have created a need for alternative energy sources, particularly those that are renewable. Biofuels have become a popular alternative fuel source because they are renewable. Crops such as corn have been considered for producing biofuels because they are capable of being converted to alcohol. When ethanol is made from corn, it arguably takes more energy to produce the ethanol than is actually obtained from it. Also, using a grain such as corn for fuel precludes it from being used as food for humans. Corn production is also hard on the land because it erodes the soil. However, a biomass such as algae is capable of creating a fuel with a high power density, is renewable and, unlike corn, does not take away a food source from humans and livestock.

SUMMARY

A biomass producing system is described that is disposed in a large body of water for use in producing a biomass that can be converted into a useful biofuel. The system relies on a pool of freshwater that is located in a large body of water for growing the biomass. Because it is a large body of water, the system can be of indefinite size and has a ready source of water to replenish the freshwater pool.

In one example, the system includes a flexible polymeric membrane that is capable of holding freshwater. The membrane is impermeable to sea water and has a perimeter edge and a volume. Freshwater is contained within the volume. A float is connected to the perimeter edge of the membrane to give the membrane buoyancy. The membrane is disposed in the sea and the membrane that defines the volume is sunk below the surface of the sea. A filtration system is connected to the float. The filtration system has an inlet that is for introduction of sea water and an outlet that is for discharging freshwater into the volume of the membrane. A biomass extractor is connected to the float to harvest biomass from the freshwater contained within the volume of the membrane.

In another example, the system includes a freshwater pool suspended in sea water by at least one float, wherein the freshwater pool includes a flexible polymeric membrane that is impermeable to sea water. A filtration system is connected to the pool that has an inlet that is for introduction of sea water and an outlet that is for discharging freshwater into the pool. In addition, a biomass extractor is connected to the pool to harvest biomass from the pool.

In another example, the system includes a freshwater pool suspended in a freshwater lake by at least one float, wherein the freshwater pool includes a flexible polymeric membrane. A biomass extractor is connected to the pool to harvest biomass from the pool.

DRAWINGS

DETAILED DESCRIPTION

Figure 1:
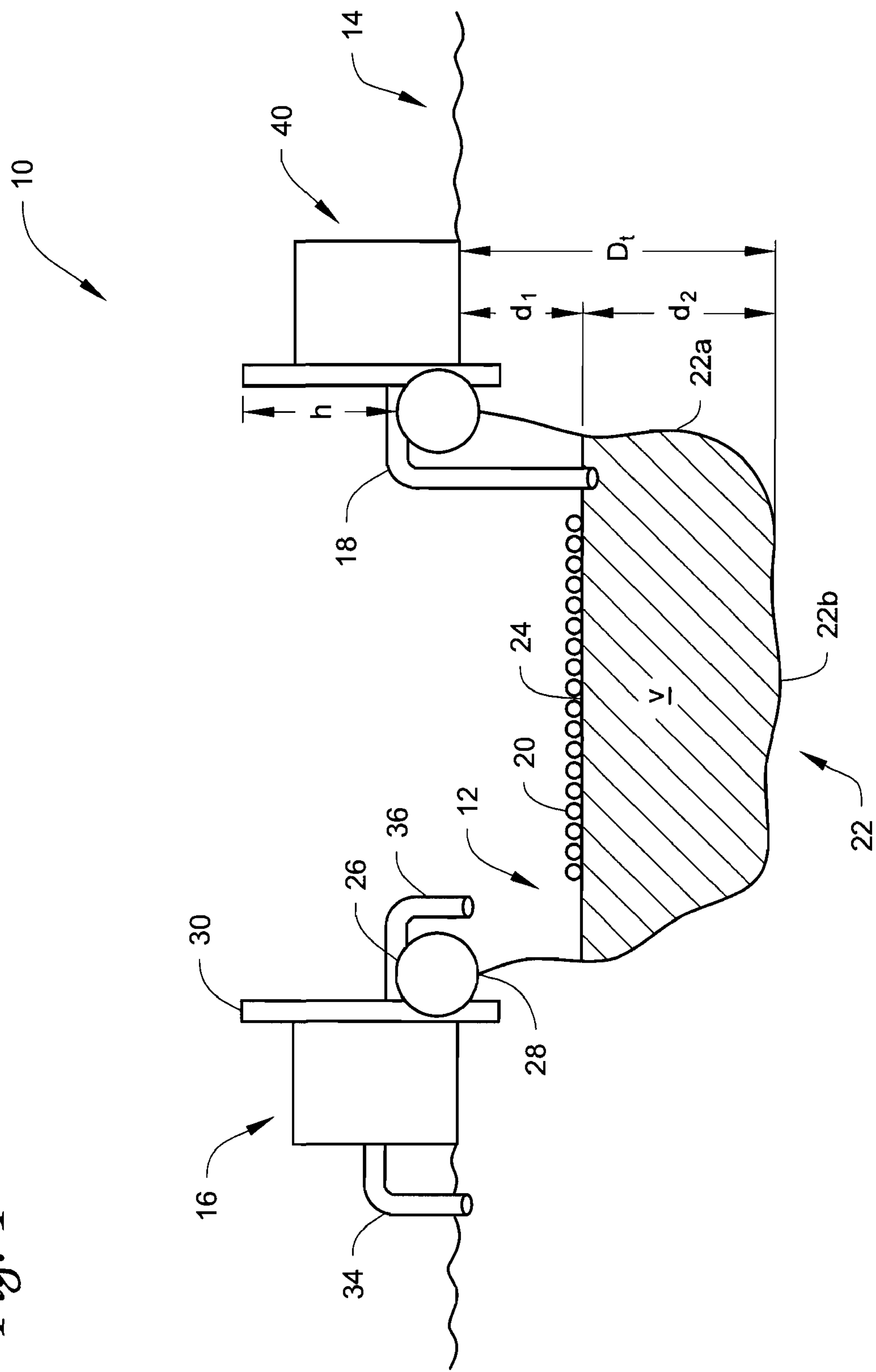
FIG. 1 is a cross-sectional side view of the biomass producing system according to one embodiment.
Figure 2:
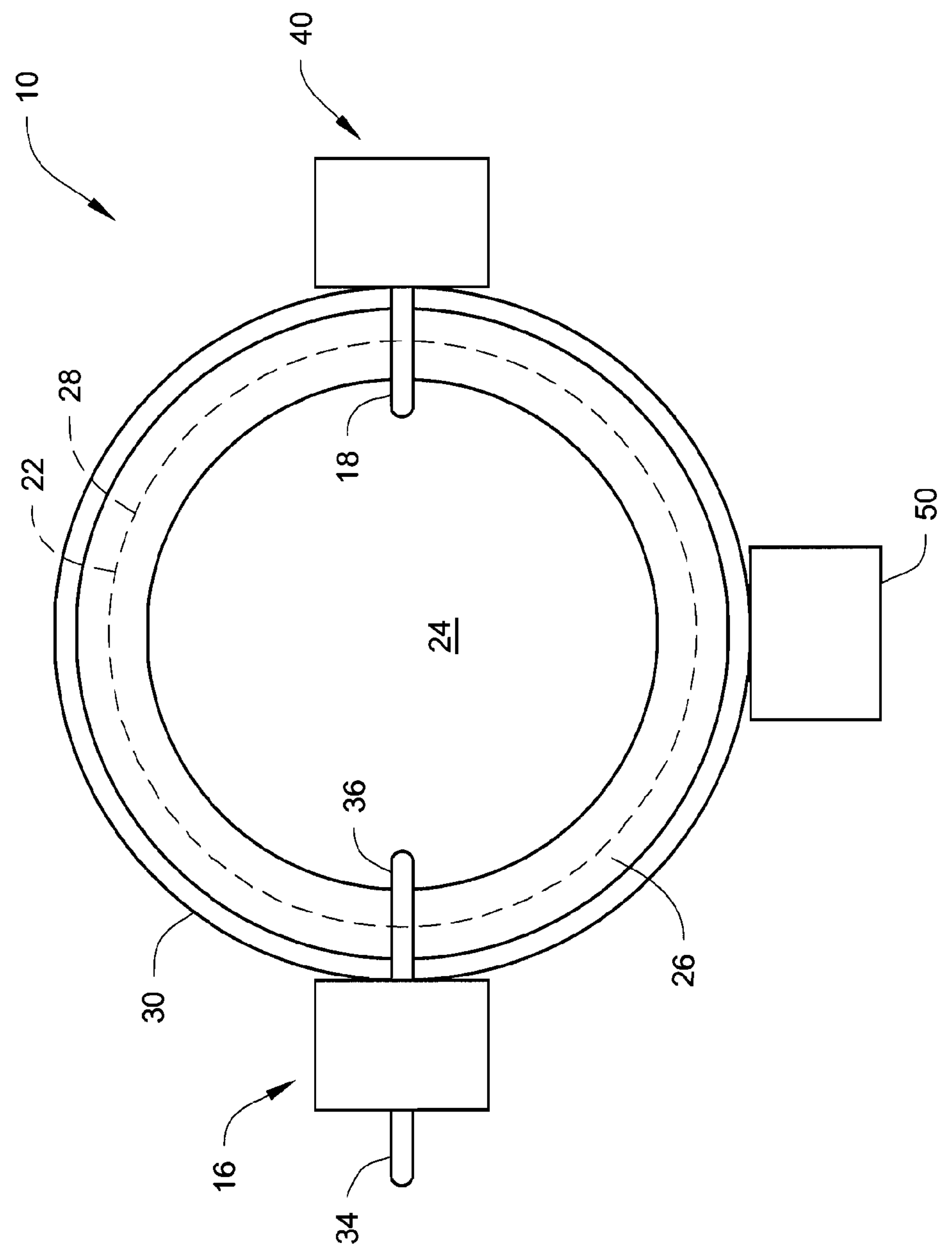
FIG. 2 is a top view of the biomass producing system as shown in FIG. 1.

FIGS. 1 and 2 illustrate an example of a biomass producing system 10 incorporating the concepts described herein. The system 10 includes a freshwater pool 12 suspended in a large body of water 14. The large body of water can be either a sea or a freshwater lake. A filtration system 16 is connected to the pool 12 for replenishing the freshwater in the pool. A biomass extractor 18 is also connected to the pool to harvest a biomass 20 that is grown in the freshwater.

As used herein, sea water is water that contains dissolved salts such as NaCl and is denser than freshwater. The sea is defined as a large expanse of sea water, examples of which include the Atlantic Ocean, the Pacific Ocean, the Mediterranean Sea, the Aegean Sea and the Gulf of Mexico. A lake is defined as a large expanse of freshwater, for example Lake Superior.

The freshwater pool 12 is made up of a flexible membrane 22 that holds freshwater. As shown in FIGS. 1-2, the flexible membrane 22 has a perimeter edge 28, a side surface 22*a*, a bottom 22*b* and a volume v. The bottom 22*b* of the membrane 22 can have a number of configurations, for example relatively planar as shown in FIG. 1, generally curved, tapered to a point so that the membrane 22 is generally conical in shape, and the like.

The flexible membrane 22 can be impermeable to sea water, for example a polymeric material. However, if the flexible membrane 22 is located in a lake, the material need not be impermeable to sea water but is impermeable to the water in the lake. Thus, the membrane 22 is intended to maintain a separation between the freshwater held within the membrane, and the water within which the membrane is disposed. The membrane 22 can be of a dark color to absorb heat from the sun and thus encourage the biomass 20 growth. For the purpose of this disclosure, flexible shall mean being capable of changing shape with the application of minimal pressure.

The freshwater pool also has a surface 24 where the surface 24 can be of indefinite size. In one embodiment, the surface 24 can have a surface area of several hundred acres. A larger or smaller surface area can be used. The surface 24 of the freshwater pool 12 is disposed below the surface of the sea 14 at a depth d1 which is deep enough to minimize the agitating effects of waves on the freshwater pool 12. In one embodiment, the surface 24 is disposed at least about 10 ft. below the surface of the large body of water 14. However, other distances can be used depending on, for example, the anticipated size of the waves on the large body of water 14. The freshwater pool 12 has a depth d2 that is measured from the freshwater surface 24 to the membrane bottom 22*b*. The volume v of the pool 12 is defined by the amount of freshwater that is held by the membrane 22. The depth d1 and the depth d2 add up to the membrane's total depth Dt.

The freshwater pool 12 is suspended in the large body of water 14 by the attachment of one or more floats 26 to the perimeter edge 28 if the membrane 22. The float 26 is used to give the membrane 22 buoyancy. The float 26 can be made of any material capable of floating on a large body of water 14. Examples of such materials would include a metal float similar to a buoy, polypropylene foam encased in a membrane envelope or a membrane enclosed ring similar to a life-ring or vest. In FIG. 2, the float 26 is shown as a singular device connected to the perimeter edge 28 of membrane 22 and shaped like a donut, and defining the perimeter of the freshwater pool 12. In another embodiment, multiple floats 26 can be placed around the perimeter edge 28 of the membrane 22 as long as there are enough of the floats 26 to keep the freshwater pool 12 afloat with little or minimal gapping in the perimeter edge 28 of the membrane 22 that may allow an influx of sea water into the freshwater pool.

Attached to the float 26 is a barrier 30. As shown in FIG. 1, the barrier 30 extends above the surface of the float 26 a distance h. Distance h can be any distance that is high enough to prevent waves in the sea from entering the freshwater pool 12. In one example, distance h is 10 ft. above the surface. The barrier 30 can be shaped like a vented umbrella, so that it would allow some air escape, but would capture the majority of water spillage out of the pool 12. The barrier 30 can be made of the same material as the flexible membrane 22, for example a polymeric material. The barrier 30 can also be made of a material similar to sailcloth. The barrier 30 can be capable of withstanding conditions such as wind and corrosion from sea salt. Since the barrier 30 is above the surface of the large body of water 14, the barrier 30 may act as a sail when the wind blows, and cause movement of the system 10.

If the system is placed in the sea, a filtration system 16 is attached to float 26. In FIGS. 1-2, the filtration system 16 has an inlet 34 that is for introduction of sea water and an outlet 36 that is for discharging freshwater into the pool 12. The filtration system 16 processes the sea water introduced through the inlet 34 into freshwater and discharges the freshwater into the pool 12.

In one embodiment, the filtration system 16 uses reverse osmosis to remove the salt from the sea water. The process of reverse osmosis is known. The filtration system can instead use electrolysis or any other means to remove salt from the sea water.

In another embodiment, the filtration system 16 uses constant filtration to filter the pool 12. Instead of taking sea water from outside the pool 12 and filtering it into freshwater to be delivered into the pool 12, the filtration system 16 takes water from the pool 12, filters it, and releases it back into the pool 12 like in an aquarium. The filtration system 16 would have a sensor capable of detecting the presence of salt within the pool 12. When salt reaches a certain level within the pool, the sensor would tell the filtration system 16 to begin to filter the salt from the pool 12 until the amount of salt within the pool had returned to an appropriate level.

The biomass extractor 18 is connected to the pool 12 to harvest the biomass 20 from the pool 12. In one embodiment, the biomass extractor 18 is a suction tube connected to a suction device for suctioning the biomass from the freshwater pool. However, the biomass extractor 18 can be any device capable of removing the biomass 20 from the freshwater pool 12.

The suspended pool 12 can be seeded with the biomass 20 on an as needed basis. The biomass 20 can be any form of life that is capable of living in freshwater and capable of being harvested for use as a biofuel. An example of a biomass is algae. Algae is known as a high density renewable fuel source. Approximately 1 acre of algae is capable of producing 700 gallons of oil. Algae grow on the surface of freshwater making it relatively easy to harvest. In one embodiment, the depth d2 of the freshwater in the pool can be at least about 10 ft. deep.

To keep up with the biomass 20 growth, the algae can be harvested on a daily basis or an any desired harvesting schedule. For example, the biomass extractor can harvest the algae for one hour each day. Because of water loss due to evaporation and removal with the biomass in the biomass extractor, the pool 12 can be refreshed periodically with freshwater from the filtration system 16.

Biomass that has been harvested can be processed into fuel in a bio-refinery 40. The bio-refinery 40 may be connected to the system 10 such as shown in FIGS. 1-2 connected to the float 26. Or, the bio-refinery 40 may be located at a location away from the system with harvested biomass being transported in a suitable manner to the refinery. In either case, the biomass is processed into fuel using refinery methods known in the art.

The filtration system 16 and the biomass extractor 18 are placed around the periphery of the pool 12. In FIG. 1, the filtration system and the biomass extractor are shown located on opposite sides of the pool 12. There may be more than one filtration system 16 and more than one biomass extractor 18 in each biomass producing system (as well as more than one bio-refinery) depending on the size of the freshwater pool 12. Due to the size of the pool 12, the extractor 18 can be positioned such that wind can be used to move the biomass 20 towards the biomass extractor 18 for easier extraction. Also, when the filtration device 16 is discharging freshwater into the pool 12, a sympathetic current may be formed that naturally pushes the biomass 20 towards the extractor 18.

The biomass producing system 10 can be anchored so that it does not move freely within the sea, or it can be allowed to float freely. If allowed to float freely, a propulsion device 50 may be attached to the system to control the movement of the biomass producing system 10 within the sea. For example, the propulsion device 50 may be needed to move the system back to its original location after it drifts. The propulsion device may be, for example, one or more engine driven propellers. The propulsion device may be powered by energy obtained from the biofuel.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A sea based biomass producing system comprising:

a flexible polymeric membrane that is capable of holding freshwater, the membrane is impermeable to sea water, the membrane has a perimeter edge, and defines a volume;

freshwater that is contained within the volume of the membrane;

a float connected to the perimeter edge of the membrane to give the membrane buoyancy;

wherein the membrane is disposed in a sea and the membrane that defines the volume is sunk below the surface of the sea;

a filtration system;

a biomass extractor connected to the float to harvest biomass from the freshwater contained within the volume of the membrane.

2. The system of claim 1 further comprising a barrier connected to the float that prevents sea water from entering the volume of the membrane.

3. The system of claim 1 wherein the filtration system is connected to the float and has an inlet that is for introduction of sea water and an outlet that is for discharging freshwater into the volume of the membrane and a reverse osmosis system to remove salt from the salt water.

4. The system of claim 1 further comprising a biomass refinery connected to the biomass extractor where biomass is refined into a biofuel.

5. The system of claim 1 further comprising a propulsion device connected to the biomass producing system to move the biomass producing system.

6. The system of claim 1 wherein the freshwater contained within the volume of membrane has a top level and the top level is disposed at least about 10 ft. below the surface of the sea.

7. The system of claim 1 wherein the filtration system and the biomass extractor are located opposite one another along the perimeter edge of the membrane.

8. The system of claim 1 wherein the filtration system includes a sensor to detect the presence of salt within the freshwater and a filter to remove the salt from the freshwater.

9. A sea based biomass producing system comprising:

a freshwater pool suspended in sea water by at least one float, wherein the freshwater pool includes a flexible polymeric membrane that is impermeable to sea water;

a filtration system connected to the pool; and a biomass extractor connected to the pool to harvest biomass from the pool.

10. The system of claim 9 further comprising a barrier connected to the float that prevents sea water from entering the pool.

11. The system of claim 9 wherein the filtration system has an inlet that is for introduction of sea water and an outlet that is for discharging freshwater into the pool and a reverse osmosis system for filtering the salt from the freshwater.

12. The system of claim 9 further comprising a biomass refinery connected to the biomass extractor where biomass is refined into a biofuel.

13. The system of claim 9 further comprising a propulsion device connected to the biomass producing system to move the biomass producing system.

14. The system of claim 9 wherein the freshwater contained within the pool has a top level and the top level is sunk at least about 10 ft. below the surface of the sea water.

15. The system of claim 9 wherein the pool has a perimeter edge and the filtration system and the biomass extractor are located opposite one another along the perimeter edge.

16. The system of claim 9 wherein the filtration system includes a sensor to detect the presence of salt within the freshwater pool and a filter to remove the salt from the freshwater pool.

17. A water based biomass producing system comprising:

a flexible polymeric membrane that is capable of holding freshwater and is disposed in a body of water, the membrane is impermeable to the water of the body of water, the membrane has a perimeter edge and defines a volume;

freshwater that is contained within the volume of the membrane;

a float connected to the perimeter edge of the membrane to give the membrane buoyancy;

the membrane that defines the volume is sunk below the surface of the body of water; and a biomass extractor connected to the float to harvest biomass from the freshwater contained within the volume of the membrane.

18. The system of claim 17 wherein the body of water is a freshwater lake or a sea.

19. The system of claim 17 further comprising a biomass refinery connected to the biomass extractor where biomass is refined into a biofuel.

20. The system of claim 17 further comprising a propulsion device connected to the biomass producing system to move the biomass producing system.

* * * * *